United States Patent [19]

Olashaw

[11] 3,855,504
[45] Dec. 17, 1974

[54] SWITCHBOARD WITH IMPROVED HORIZONTAL BUSBAR MOUNTING PROVISIONS

[75] Inventor: William Francis Olashaw, Plainville, Conn.

[73] Assignee: General Electric Company, New York, N.Y.

[22] Filed: Sept. 27, 1973

[21] Appl. No.: 401,245

[52] U.S. Cl. .................... 317/120, 174/71 B
[51] Int. Cl. ............................ H02b 1/20
[58] Field of Search .......... 317/119, 120; 174/70 B, 174/71 B, 72 B, 88 B, 99 B, 149 B, 174

[56] References Cited
UNITED STATES PATENTS

| | | | |
|---|---|---|---|
| 3,210,716 | 10/1965 | Meacham | 174/70 B |
| 3,308,348 | 3/1967 | Olashaw | 317/119 |
| 3,493,818 | 2/1970 | Paape | 174/71 B |
| 3,531,758 | 9/1970 | Blumkin | 174/99 B |
| 3,588,620 | 6/1971 | Wasileski | 317/119 |
| 3,710,198 | 1/1973 | Burton | 317/120 |
| 3,732,523 | 5/1973 | Fouse | 174/71 B |

*Primary Examiner*—Robert K. Schaefer
*Assistant Examiner*—Gerald P. Tolin
*Attorney, Agent, or Firm*—Robert A. Cahill; Philip L. Schlamp; Frank L. Neuhauser

[57] ABSTRACT

A switchboard construction utilizes modular, insulative mounting panels to both electrically isolate and physically mount the various busbars, as well as, via line straps, the various electrical devices to the cabinet frame. The mounting panels installed vertically end-to-end also serve as rear barriers for the compartments accommodating the electrical devices. Barrier sheets secured to the front and back of the panels shield personnel from live parts. Load straps pass through apertures in the panels and vertical buses to the rear of the cabinet for convenient load connection. Horizontal bus sections are joined, electrically connected to and mounted by the vertical buses at common locations.

10 Claims, 6 Drawing Figures

SWITCHBOARD WITH IMPROVED HORIZONTAL BUSBAR MOUNTING PROVISIONS

BACKGROUND OF THE INVENTION

The present invention relates to electrical switchboards for accommodating various electrical devices, e.g., switches, circuit breakers, transformers, motor controllers, etc., utilized in the distribution and utilization of electrical power. Such switchboards typically include one or more side-by-side cabinets having a metallic framework for mounting the cabinet sides, doors, etc. The framework also serves, via elaborate bracketing and insulating members, to insulatively mount and isolate the vertical and horizontal buses, in addition to the various electrical devices. Such conventional techniques for mounting the devices and buses are expensive and take up considerable space. Consequently, the cabinets must have considerable depth to accommodate the mounting provisions and to provide space in the rear for routing of the various cables used to electrically connect the loads to the ends of the device load straps. Also the cabinets must have considerable width to provide adequate electrical clearance between buses of different polarity or voltage. Moreover, elaborate isolating or barrier members must be provided to shield installation and maintenance personnel from live parts.

Further complicating the construction of existing electrical switchboards is the fact that they are typically required to accommodate a wide variety of electrical devices of varying physical sizes and ratings. Consequently, the manufacture of such switchboards, to provide the requisite versatility, requires a large inventory of variously sized parts, otherwise special drilling, cutting and forming operations must be performed during assembly.

In partial solution to these and other drawbacks of the prior art, U.S. Pat. No. 3,308,348 discloses a switchboard construction utilizing insulative mounting blocks for the vertical buses. However, these individual blocks are not effective as rear compartment barriers since they are mounted to the switchboard framework in vertically spaced relation. Moreover, they have a relatively large depth dimension and thus do not permit significant reductions in cabinet depth.

It is accordingly an object of the present invention to provide an improved electrical switchboard design utilizing a unique, modular mounting panel of electrically insulative material in lieu of myriad insulating and bracketing elements.

An additional object of the invention is to provide an electrical switchboard of the above character which requires less cabinet space than conventional designs.

A further object of the invention is to provide an electrical switchboard of the above character which includes a barrier provisions for effectively shielding the electrically live parts thereof, thus providing increased safety for installation and maintenance personnel.

Still another object is to provide an electrical switchboard of the above character which is readily adapted to accepting various sizes and ratings of control units, thus simplifying fabrication and assembly.

Yet another object is to provide an electrical switchboard of the above character which is economical to manufacture, the efficient to install and maintain.

Other objects will in part be obvious and in part appear hereinafter.

SUMMARY OF THE INVENTION

In accordance with the present invention, an electrical switchboard is provided to incorporate uniquely configured modular mounting panels having the requisite physical and electrical characteristics to physically, insulatively mount the various busbars to the cabinet framework without additional bracketing and insulating elements. The base plate carries elongated, upstanding ribs forming channels for the vertical buses which are bolted to the mounting panels using aligned, distributed bolt holes pre-formed in the vertical buses and panels. Horizontal busbars are formed in sections, and, at each cross-over location of correspondingly phased horizontal and vertical busbars. The horizontal busbar sections are joined as well as mounted and electrically connected to the phase associated vertical busbar; the bracket being formed to facilitate a common bolted joint between the horizontal busbar sections and between the horizontal and vertical busbars.

The invention accordingly comprises the features of construction, combinations of elements, and arrangement of parts which will be exemplified in the instruction hereafter set forth, and the scope of the invention will be indicated in the claims.

BRIEF DESCRIPTION OF THE DRAWINGS

For a better understanding of the nature and objects of the invention reference should be had to the following detailed description taken in connection with the accompanying drawings, in which.

Corresponding reference numerals refer to like parts throughout the several views of the drawings.

DETAILED DESCRIPTION

Figure 1:
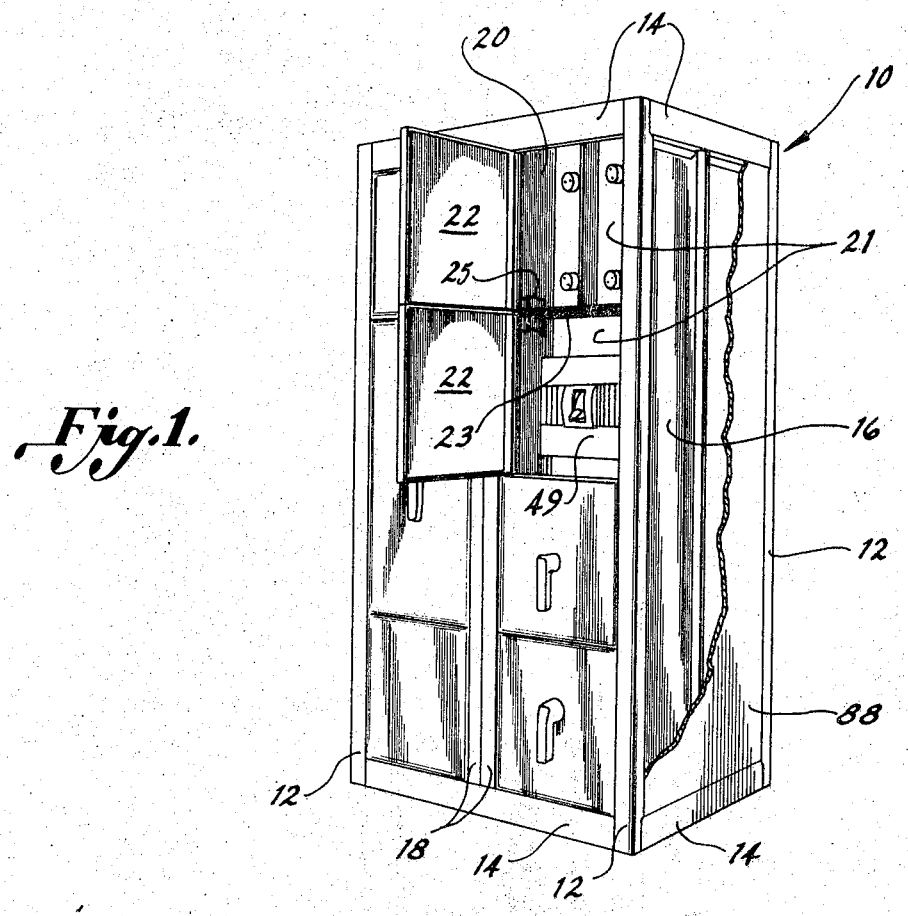
FIG. 1 is a perspective view of an electrical switchboard constructed in accordance with a preferred embodiment of the invention.
Figure 4:
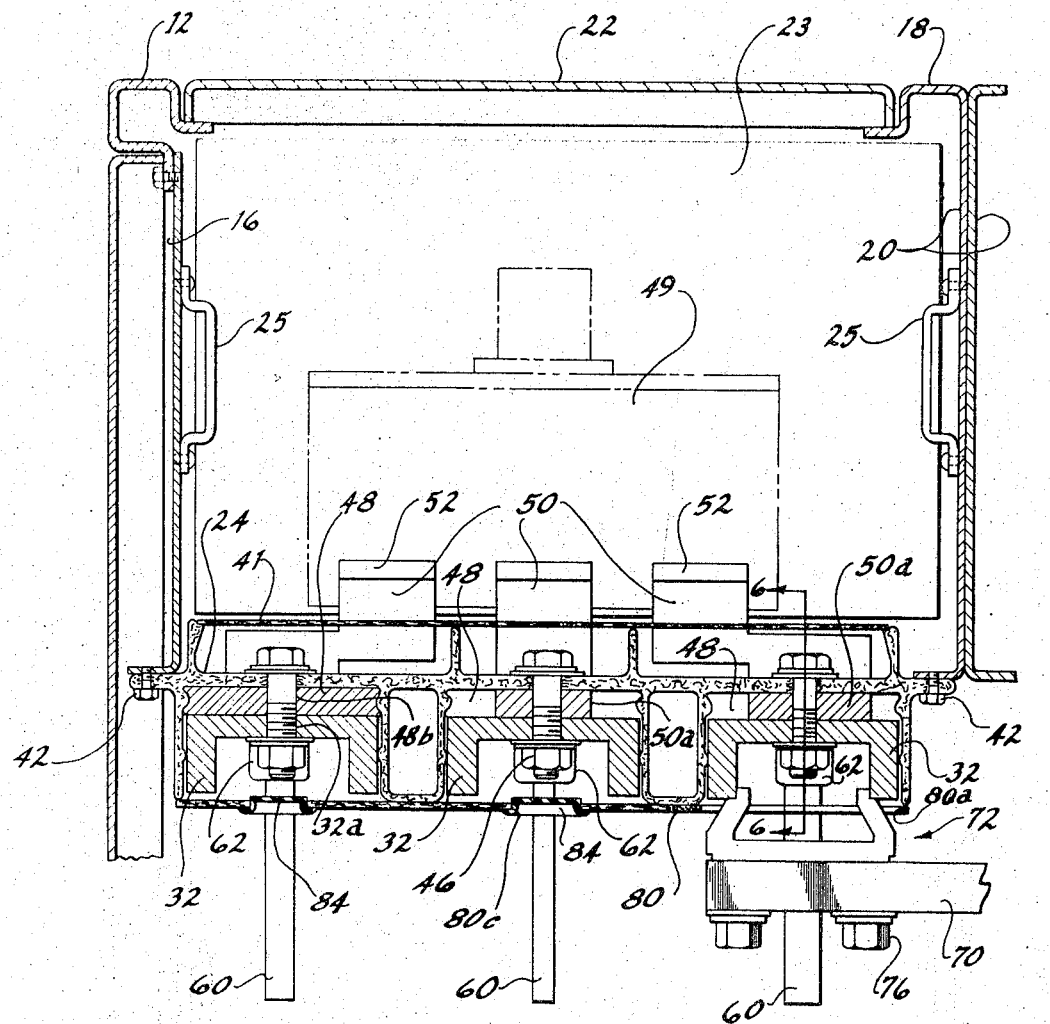
FIG. 4 is a sectional view taken along line 4—4 of FIG. 3.

The electrical switchboard design of the present invention is embodied in a switchboard, generally indicated at 10 in FIG. 1, which includes a rectangular steel framework consisting of corner posts 12, interconnecting horizontal beams 14, side mounting partitions 16, and a pair of intermediate structural members each consisting of an integral vertical post 18 and mounting partition 20 (FIG. 4). Mounting partitions 20 divide the switchboard cabinet into two or more switchboard sections of stacked compartments 21 to which access is afforded by doors 22. Horizontal barrier sheets 23 mounted by brackets 25 attached to the mounting partitions 20 and 16 divide the switchboard sections into the stacked compartments.

Figure 2:
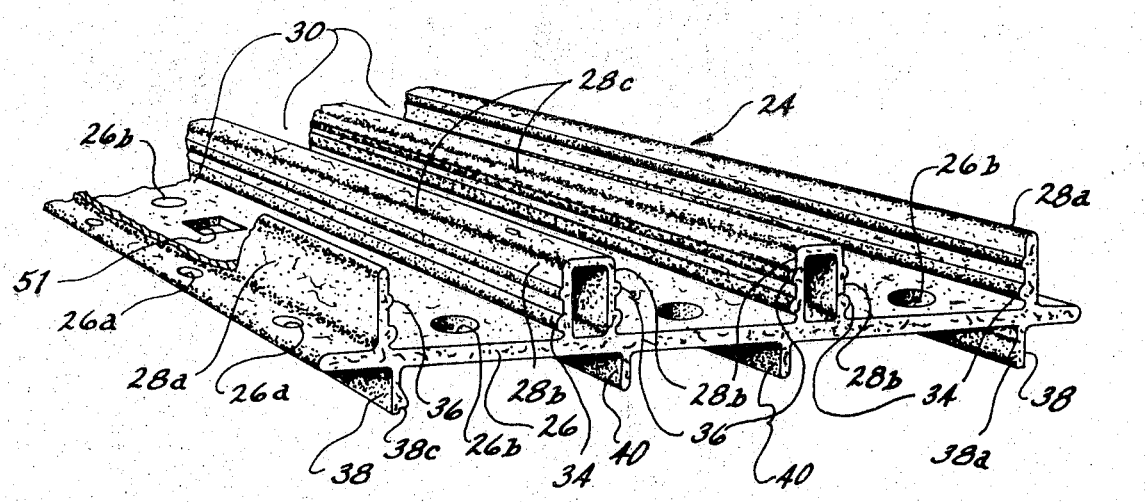
FIG. 2 is a perspective view, partially broken away, of a modular mounting panel incorporated in the switchboard of FIG. 1.

An important feature of the present invention resides in the utilization of a uniquely configured, modular mounting panel 24, seen in perspective in FIG. 2 and in cross section in FIG. 4. The mounting panels are of a structurally rigid, electrically insulative material, such as a glass fiber polyester, formed by an extrusion process or the like. As best seen in FIG. 2, each mounting panel 24 includes a base plate 26 having a width conforming to the width of a switchboard section of the switchboard 10, and a length conforming to the height of the individual compartments. It is understood that the compartment height varies depending on the size of the electrical device to be accommodated therein. For ease of manufacture and assembly, the cabinet heights are established on a modular dimension format, e.g., increments of 7 inches. Outstanding from one side of base plate 26 are integrally formed, outboard ribs 28a and two pairs of intermediate or inboard ribs 28b running coextensively with the modular length of the individual mounting panels 24. The paired intermediate ribs 28b are interconnected at their ends opposite from base plate 26 by coextensive bridging segments 28c. As will be seen from the description to follow, ribs 28a and 28b cooperate to define, in conjunction with base plate 26, three channels 30, each accommodating an elongated vertical busbar 32 of U-shaped cross-section as seen in FIG. 4, but may be of other cross-sectional configurations.

Still referring to FIG. 2, the opposing surfaces ot the ribs 28a, 28b constituting the channel sidewalls are each formed with laterally protruding ridges 34 and 36, each coextensive with the modular length of mounting panel 24. As will be seen from the description to follow, ridges 34 serve to achieve an interlocking fit with spacers used in the mounting of the vertical busbars to the mounting panels 24. Ridges 36 serve to space the busbars from the rib sidewalls and thus assure sufficient oversurface electrical clearance between adjacent busbars.

A pair of outboard ribs 38 and a pair of intermediate ribs 40 are integrally formed in outstanding relation with base plate 26 on the opposite side from ribs 28a, 28b. These ribs likewise run coextensively with the length of the mounting panel 24 and serve to define channels accommodating the line and load straps for the electrical devices, as will be described. Outboard ribs 38 are flared adjacent their free ends and recessed to provide elongated seats 38a accommodating the lateral edge portions of insulative barrier sheets 41 (FIG. 4) serving to effectively shield personnel from the electrical device line and load straps. Sheets 41 may be held in place using a suitable adhesive, or the equivalent.

Figure 3:
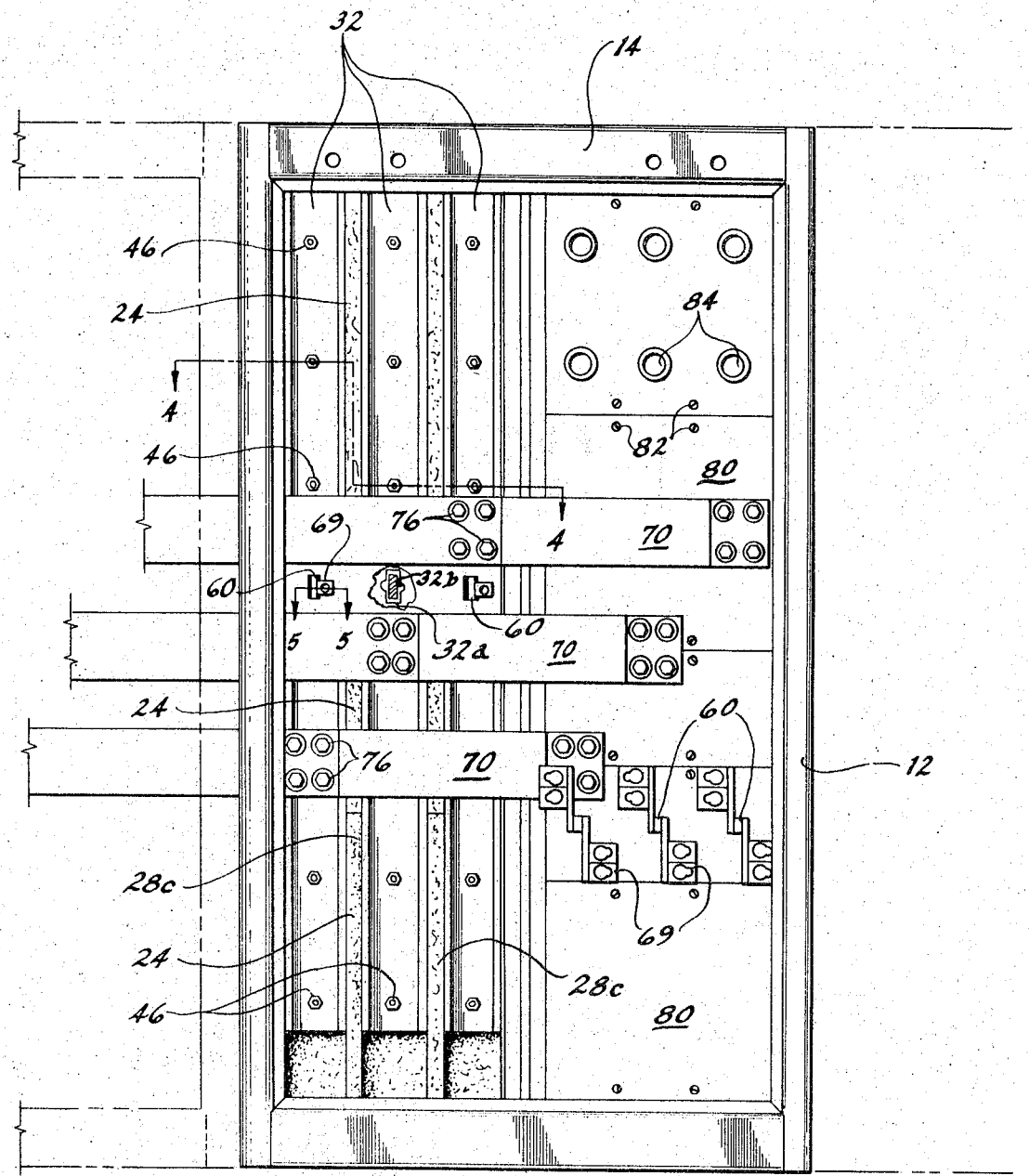
FIG. 3 is a rear elevational view of one of the switchboard sections of the switchboard of FIG. 1.

Turning to FIGS. 3 and 4, the marginal edge portions of the modular mounting panels are pre-formed with bolt holes 26a (FIG. 2) at regular intervals to receive suitable fasteners, such as self-tapping screws 42, for mounting the mounting panels to the laterally turned, flanged end portions of the framework mounting partitions 16 and 20. The thus mounted mounting panels extend end to end in each cabinet section throughout the entire height of the switchboard 10, as seen in FIG. 3. Vertical busbars 32 are disposed in channels and secured in place by bolts 46 passing through aligned holes 32a and 26b in the busbars and the panel base plate, respectively, pre-formed at regular intervals. A series of spacers 48 (FIG. 4) having their opposed lateral edges grooved, as indicated at 48a, to interfit with the ridges 34 serve to support busbars 32 in spaced relation to the channel bottoms and also from the inter-panel seams as the busbars are clamped in place by the nuts threaded on bolts 46. As will be described, the spacers 48 are also formed having tapped bores 48b which threadingly engage bolts 46 to facilitate assembly and, in the locations of load strap feedthrough, to actually secure the vertical busbar to the mounting panel 24. As also seen in the sectional view of FIG. 4, the spacer ridges 36 maintain the legs of the U-shaped vertical busbars out of contact with the main surfaces of the ribs 28b, thus effectively increasing the oversurface electrical clearance between adjacent busbars to also include the surface portions of ribs 28b between the spacer ridges and the bridging segment 28c, thus to preclude line-to-line arcing.

Figure 6:
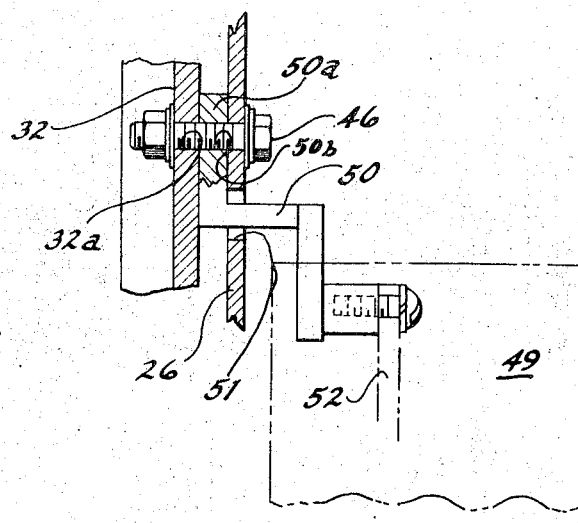
FIG. 6 is a fragmentary sectional view taken along line 6—6 of FIG. 4.

To effect line connection between the vertical busbars and the line terminals of the electrical devices in the various cabinet compartments (one illustrated at 49 in FIG. 1), suitable formed line straps 50, one shown in elevation in FIG. 6, have one end portion 50a adapted to the thickness of the spacers 48 and tapped at 50b to threadingly engage a bolt 46, thereby retaining the line straps in place during assembly. After assembly of the vertical busbars, the nuts are threaded onto the ends of the bolts 46 to clamp the vertical busbars against the line strap portions 50a to effect a good electrical connection therebetween. The intermediate portions of line straps 50 extend through pre-formed apertures 51 in base plate 26 to a termination suitable for bolted connection to the line terminals 52 of the electrical device 49. It will be appreciated that the line straps are of various configurations in order to accommodate the differing lateral offsets of the line terminals of differing electrical devices relative to the busbar mounting bolts 46.

Figure 5:
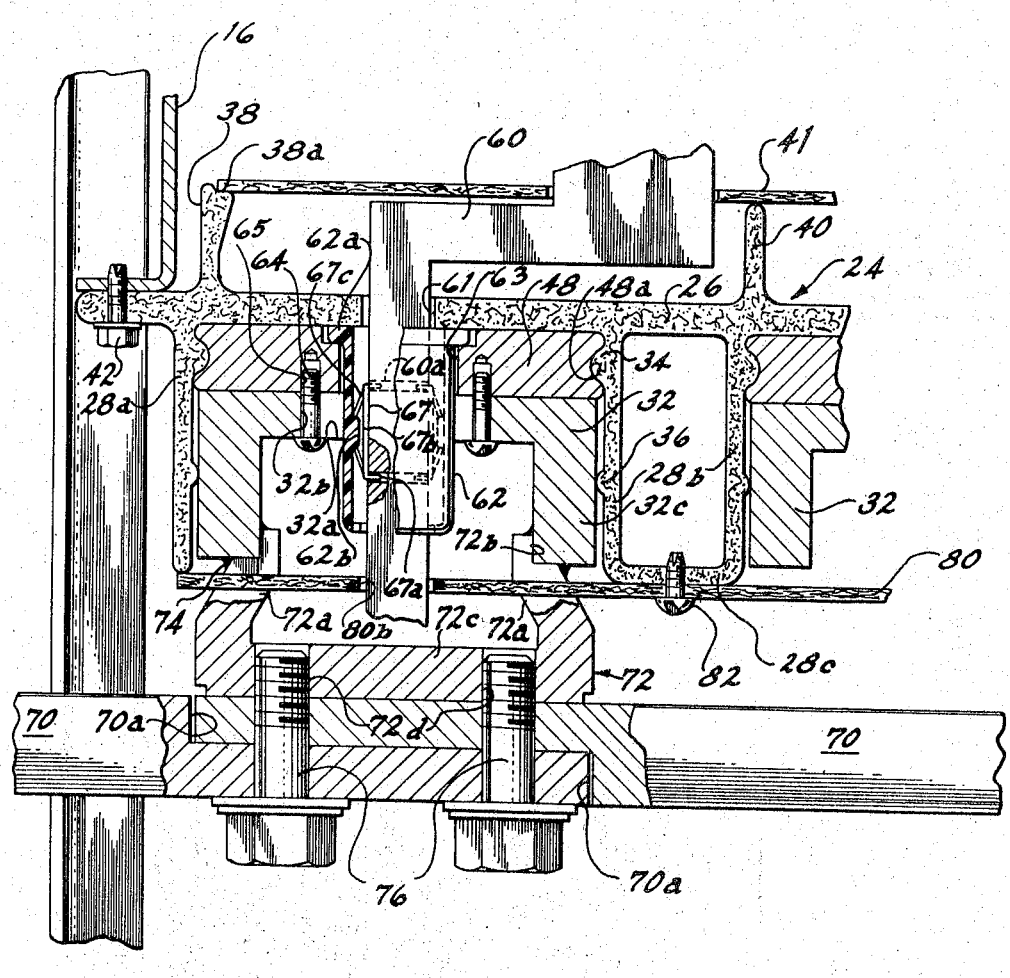
FIG. 5 is an enlarged sectional view taken along line 5—5 of FIG. 3.

To connect the electrical device to a load, suitably formed load straps, one of which being indicated at 60 in FIG. 5, are employed. One end of each load strap is suitably formed for bolted connection to a load terminal of the electrical device, while a rectangular body portion thereof is adapted for extension through an aperture 61 in mounting panel base plate 26. In this instance, spacer 48 is formed with an enlarged, rectangular aperture 63, as are the vertical busbars at 32a (See also FIG. 3), to accommodate the feed-through of load straps 60. The enlarged apertures in spacer 48 and busbar 32 receive a rectangular insulating sleeve 62. One end of the aperture 63 in spacers 48 is recessed to seat an external rim 62a formed on sleeve 62. Tapped holes 65 formed in spacer 48 adjacent the aperture therethrough receive screws 64 which pass through notches 32b formed in the sides of the busbar aperture 32a, thereby clamping the busbar to the spacer. Since the spacers are locked in the channel bottoms by ridges 34, the vertical busbars are effectively secured to the mounting panels at the load strap feedthrough locations, thus maintaining, along with bolts 46, the regular intervals of attachment of the vertical busbars to the mounting panels required for high ampere short circuit bracing.

The body portion of the load straps is formed with a pair of spaced, transverse through holes 60a which receive laterally turned ends 67a of a pair of opposed, U-shaped spring clips 67. The bridging portion 67b of each spring clip, lying against a side of the load strap is formed having a pair of resilient, opposed tabs 67c struck therefrom. With the spring clips 67 in position, the load strap is inserted rear end first through the insulating sleeve 62; the resilient tabs 67c in the direction of insertion deflecting to clear opposed bosses 62b formed on the internal sidewall of the insulating sleeve. When the trailing tabs 67c abut the bosses 62b, the leading tabs, having cleared the bosses,, snap back such that the bosses are embraced fore and aft to effectively lock the load strap in place. The rear ends of the load straps are adapted with connector lugs 69 (FIG. 3) for convenient load connection.

Horizontal or main busbars 70, best seen in FIG. 3, bring electrical power to the vertical busbars 32 of each switchboard section. The electrical connection to the vertical busbars is effected using a conductive U-shaped bracket 72, best seen in FIG. 5. The convergent legs 72a of bracket 72 are formed having notched ends, indicated at 72b, to seat on inner corners of the rearwardly extending vertical busbar legs 32c. The bracket 72 is welded to the vertical busbar, as indicated by fillets 74, to provide a physical, as well as maintenance-free electrical, connection therebetween. The bridging portion 72c is formed with a plurality of tapped holes 72d for accepting bolts 76, preferably four, mounting and electrically connecting the horizontal busbar 70 thereto. Horizontal busbar section ends are relieved, as indicated at 70a, in complementary fashion, to form a scarf joint also secured by bolts 76. It is important to note that the joining of horizontal busbar sections, the electrical connection of a horizontal busbar to a vertical busbar and the physical mounting thereof are effected at the same location, thus greatly simplifying assembly and maintenance. It is also pointed out that the horizontal bar sections may be identically formed of lengths equal to the width of a switchboard section, with one section reversed relative to the other to produce the scarf joint. An essentially linear horizontal bus system with the surfaces of the bus sections lying in respectively common planes is thus achieved. Modular insulative barrier sheets 80, secured to the bridging segments 28c of the mounting panels 24 by self-tapping screws 82, or the equivalent, shield the vertical busbars from personnel. The barrier sheets are apertured, as indicated at 80a in FIG. 5, to accommodate the mounting and electrical connection of the horizontal busbars to the vertical busbars and at 80b to accommodate the pass-through of load straps 60. The barrier sheets are also apertured at 80c in FIG. 4 to facilitate access to bolts 46 to maintain the integrity of the line connections for the electrical devices 49, as well as the physical mounting of the vertical busbars. These apertures are preferable closed by snap-fit plugs 84. Barrier sheets 41 are also appropriately apertured to accommodate the line and load straps extending to and from the electrical device 49.

An additional and highly significant advantage of the disclosed switchboard construction is the ease of assembly. The mounting panels are placed horizontally, front side up, on a suitable fixture or work surface and the various line and load straps are assembled thereto. The line straps are retained in place by bolts 46 threaded through the tapped bores in their terminal portions 50a (FIGS. 4 and 6) to clamp the portions of base plate 26 surrounding bolt holes 26b between the bolt heads and the line strap terminal portions. The load straps are retained in assembly by the spring clips 67 engaging bosses 62b of insulating sleeves 62, which are, in turn, held in place by spacers 48 captured in the channels 30 by ridges 34. Additional spacers are positioned in channels 30 at each location of a bolt hole 26b and receive bolts 46 threaded through their tapped bores 48b to retain the bolts in position. The bolts are preferably staked to the spacers and line terminal portions 50a to prevent the bolts from turning as the nuts are wrenched tight to mount the vertical busbars. The barrier sheets 41 are installed and then the electrical devices are held in position while the bolted connections between their line straps and line terminals and load straps and load terminals are effected, thereby mounting the device.

The mounting panels, each with a device and associated line and load straps assembled thereto, are inverted, and secured by self-tapping screws 42 to the mounting partitions 16 and 20 of the cabinet framework lying horizontally, face down. The vertical busbars are then dropped into their respective channels 30 and clamped in place by the nuts threaded on the exposed ends of bolts 46. At the locations of load strap feed-through, screws 64 clamp the vertical busbars to spacers 48. Preferably, the welded connections of brackets 72 to the vertical busbars are made prior to the assembly of the vertical busbars, but may be effected subsequent thereto. The barrier sheets 80 are then secured in place by screws 82. The horizontal busbars 70 are then mounted using bolts 76 to electrically interconnect the cabinet sections of switchboard 10. The switchboard is then ready to be uprighted, and side panels 88 and doors 22 are then assembled.

It is seen that practically all of the switchboard assembly is performed with the mounting members oriented horizontally, rather than vertically as is the current practice, thus taking advantage of gravity. Assembly is therefore expedited and made considerably less strenuous. Moreover, since the various components are essentially dropped into place, they need not be manually supported while the mounting connections are made. In this connection, it should be noted that, except for the device terminal connections, all connections are ultimately effected from the rear of the switchboard, thus simplifying assembly and maintenance.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described the invention, what is claimed as new and desired to secure by Letters Patent is:

1. An electrical switchboard consisting of at least two side-by-side switchboard sections for distributing polyphase electrical power to a plurality of loads via respective electrical devices accommodated in compartments stacked vertically in each switchboard section, said switchboard comprising, in combination:

A. a frame;
B. a plurality of vertical busbars in each switchboard section, one for each phase;
C. means insulatively mounting said vertical busbars to said frame;
D. connectors electrically connecting said vertical busbars to the electrical devices and the electrical devices to their respective loads;

E. a plurality of horizontal busbars, one for each phase, each said horizontal busbar being made up of several horizontal busbar sections; and
F. common means at each crossing location in each switchboard section of correspondingly phased horizontal and vertical busbars
 1. serially joining two of said horizontal busbar sections end-to-end,
 2. mounting said horizontal busbars respectively to said vertical busbars, and
 3. electrically connecting said horizontal busbars respectively to said vertical busbars; and
G. one horizontal busbar section of each said horizontal busbar extending in continuous, uninterrupted fashion between adjacent switchboard sections and having opposite ends terminating at said crossing locations in each of the switchboard sections.

2. The electrical switchboard defined in claim 1, wherein each said joining, mounting and electrically connecting means comprises a bolted joint.

3. The electrical switchboard defined in claim 1, wherein corresponding surfaces of joined busbar sections are aligned in common planes.

4. The electrical switchboard defined in claim 1, wherein the joined ends of said horizontal busbar sections are relieved to provide for a scarf joint therebetween.

5. The electrical switchboard defined in claim 1, which further includes a conductive bracket secured to each vertical busbar at said crossing locations, each said bracket including means for accepting said joining, mounting and electrically connecting means.

6. The electrical switchboard defined in claim 5, wherein each said bracket is U-shaped having leg portions and an interconnecting bridge portion, the ends of said leg portions being welded to said vertical busbars.

7. The electrical switchboard defined in claim 6, wherein said vertical busbars are also U-shaped having leg portions and an interconnecting bridge portion, said bracket leg portions being relieved at their ends to conform to the inner corners of said vertical busbar leg portions where the welded connection therebetween is located.

8. The electrical switchboard defined in claim 6, wherein said bridging portion is formed having tapped bores, and said joining, mounting and electrically connecting means comprise bolts threaded into said bores to clamp said horizontal busbars to respective ones of said bracket.

9. The electrical switchboard defined in claim 8, wherein corresponding surfaces of joined busbar sections are aligned in common planes.

10. The electrical switchboard defined in claim 8, where the ends of said horizontal busbar sections are relieved to provide for a scarf joint therebetween.

* * * * *